United States Patent [19]
Zigler

[11] Patent Number: 5,747,748
[45] Date of Patent: May 5, 1998

[54] STYLUS SHEATH FOR USE WITH TOUCH-SENSITIVE SCREENS

[75] Inventor: Robert A. Zigler, Marysville, Wash.

[73] Assignee: Intermec Corporation, Everett, Wash.

[21] Appl. No.: 690,197

[22] Filed: Jul. 26, 1996

[51] Int. Cl.⁶ .................. G08C 21/00; G09G 3/02
[52] U.S. Cl. .................. 178/18; 178/19; 345/173; 345/179
[58] Field of Search .................. 178/18, 19, 87; 345/173, 179

[56] References Cited

U.S. PATENT DOCUMENTS

| | | | |
|---|---|---|---|
| D. 352,279 | 11/1994 | Fox et al. | D14/100 |
| 5,018,208 | 5/1991 | Gladstone | 178/18 |
| 5,149,919 | 9/1992 | Greanias et al. | 178/19 |
| 5,334,976 | 8/1994 | Wang | 345/179 |
| 5,357,062 | 10/1994 | Rockwell et al. | 345/179 |
| 5,422,442 | 6/1995 | Gouda et al. | 178/18 |

FOREIGN PATENT DOCUMENTS 0 309 654   4/1989   European Pat. Off.   ....... G06K 11/06

*Primary Examiner*—Curtis Kuntz
*Assistant Examiner*—Vijay Shankar
*Attorney, Agent, or Firm*—Seed and Berry LLP

[57] ABSTRACT

A sheath consists of an elongated member with an internal volume designed to securely and removably receive the end of an elongated cylindrical instrument with a suitable radius, such as a pen or pencil. The sheath can be comprised of an elastomeric material which allows the sheath to expand as the cylindrical instrument is inserted into the internal volume, and thus exert a radial force upon the instrument and restrain any motion of the instrument relative to the sheath. The elastomeric material has a lesser hardness than the screen material so that it will not damage the screen, but a greater hardness than a soft pencil eraser so that it overcomes the problems associated therewith. The sheath can be made with a tip of any shape and sharpness so that it will be compatible with any touch-sensitive screen.

30 Claims, 3 Drawing Sheets

STYLUS SHEATH FOR USE WITH TOUCH-SENSITIVE SCREENS

TECHNICAL FIELD

The present invention relates to pointing instruments suitable for use with touch-sensitive electronic screens.

BACKGROUND OF THE INVENTION

Many electronic devices—such as computers and electronic organizers—are equipped with touch-sensitive screens through which instructions are transmitted to the device. The screen is usually segmented into different areas, and pressure applied to a certain area will issue a certain instruction to the device or cause it to perform a certain function. Touch-sensitive screens usually come with a pointing stylus which the operator of the device uses to press against the screen.

The pointing stylus is specially designed to be compatible with the touch-sensitive screen; usually, the point of the stylus is made of a material softer than the screen, so that the stylus will not scratch, dent, gouge, or otherwise damage the screen. In portable electronic devices, the stylus is usually unique to the particular device, as it is shaped to fit into a storage crevice in the device from which it can be removed for use. Thus, the manufacturer of the device is usually the sole source for obtaining a replacement stylus.

If the pointing stylus is lost, the operator of the device has a problem: the operator must continue to use the device, but obtaining a replacement stylus from the manufacturer may take days or weeks. Faced with this problem, the operator usually resorts to one of three alternative methods of operating the device, all of which have serious shortcomings. First, the operator can use a finger to exert pressure on the screen. Use of fingers causes smudges on the screen, and it may be impossible to even operate the device if the screen is segmented into many small parts such that a finger is too large to apply the requisite pressure to a given small area.

Second, the operator may resort to using the eraser end of a pencil to operate the touch-sensitive screen. This method has the disadvantage that, like the finger, it may leave smudges and debris on the screen and may also be too large for adequate operation of a screen with many small segments. Moreover, the eraser material is usually very soft, making it difficult to exert adequate pressure on the screen.

Finally, the operator may resort to using the pointed end of a common pen, pencil, or other writing instrument to operate the touch-sensitive screen. Use of ordinary writing instruments with sharp points that are harder than the screen material can gouge and scratch the screen, thus reducing its readability and decreasing its service life.

In view of the inconvenience of losing the original stylus and the disadvantages of each alternative way of using the touch-sensitive screen, there is a need for a simple, low-cost replacement which will substitute for the original stylus, either permanently or until the original can be replaced.

SUMMARY OF THE INVENTION

The present invention provides a stylus sheath which simply and inexpensively solves the above problems and provides additional benefits by transforming an ordinary writing instrument—or any elongated cylindrical body with a compatible radius—into a pointing stylus compatible with touch-sensitive electronic screens.

The sheath preferably consists of an elongated member with an internal volume designed to securely and removably receive the end of an elongated cylindrical instrument with a suitable radius, such as a pen or pencil. The sheath can be comprised of an elastomeric material which allows the sheath to expand as the cylindrical instrument is inserted into the internal volume, and thus exert a radial force upon the instrument and restrain any motion of the instrument relative to the sheath. The elastomeric material has a lesser hardness than the screen material so that it will not damage the screen, but a greater hardness than a soft pencil eraser so that it overcomes the problems associated therewith. The sheath can be made with a tip of any shape and sharpness so that it will be compatible with any touch-sensitive screen.

DETAILED DESCRIPTION OF THE INVENTION

Figure 1:
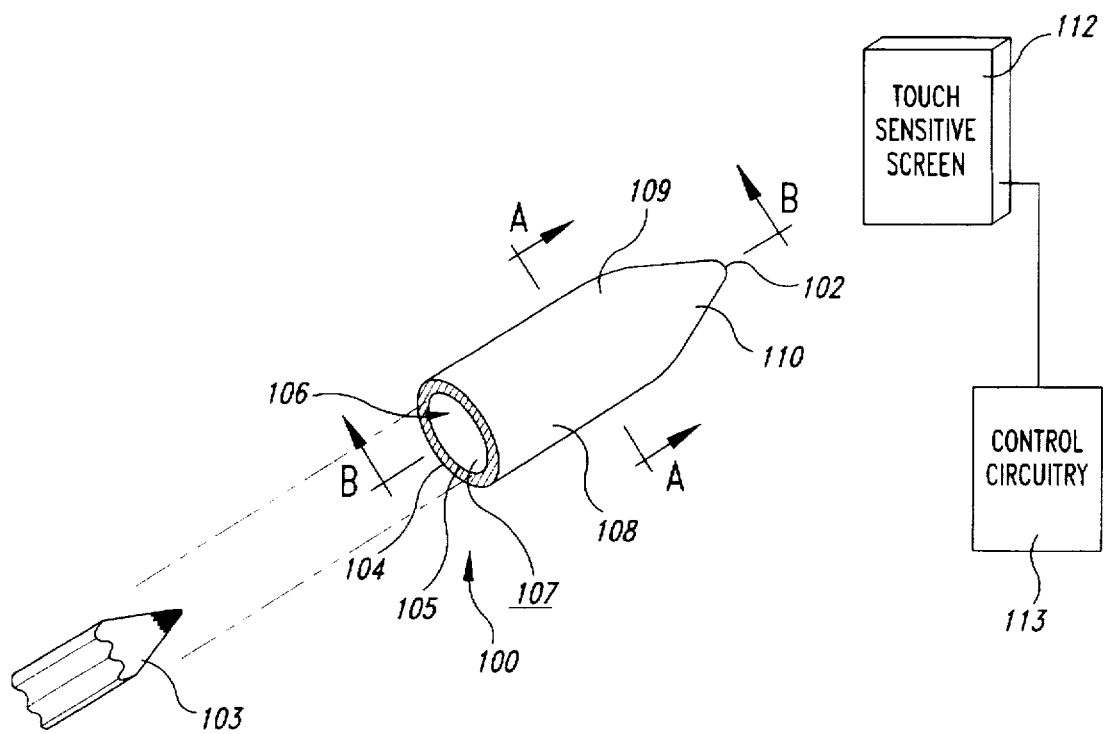
FIG. 1 is a partial block, partial isometric view of a stylus sheath of the present invention and an elongated cylindrical writing instrument and a touch-sensitive screen with control electronics with which the sheath may be used.

As shown in FIG. 1, the present invention is embodied in a sheath 100 comprising a single, integrally formed piece extending in a longitudinal direction between a distal end and a proximal end 104. The sheath preferably has a constant-dimension cross section 108 (FIG. 3) between the proximal end 104 and an intermediate position between the proximal end 104 and the distal end. A tapering portion 110 extends between the intermediate position and the distal end, where the sheath tapers to a tip 102. The proximal end 104 of the sheath has a proximal opening 105 through which an elongated cylindrical object, such as a common pen or pencil 103, is inserted into an internal volume 106.

If the sheath 100 has an inappropriate length, the combination formed when pencil 103 is inserted in sheath 100 could be awkward for the user's hand to hold. Thus, the overall length of the sheath 100 could be such that, when placed on the pencil 103, it extends far enough up the length of the pencil 103 that the exterior surface 109 provides a location where the thumb and forefingers of a user's hand can comfortably hold the combination of sheath 100 and pencil 103. Letters, words, phrases, company logos, or other graphic representations 111 can be placed on the exterior surface 109, making the sheath a promotional item.

The sheath 100, when placed on pencil 103 and used in conjunction with a touch-sensitive screen 112 connected to suitable control electronics 113, forms a complete system for transmitting input to electronic devices with which the screen 112 and control electronics 113 are compatible.

The sheath 100 is preferably made of an elastomeric material of lesser hardness than polycarbonate or polyester materials used on typical touch-sensitive screens 112, but of greater hardness than a simple pencil eraser. Thus, the elastomeric material should have a durometer rating of 60 and 90 on the Shore A scale. Examples of suitable sheath materials are PVC, polyethylene, and polypropylene.

Figure 2:
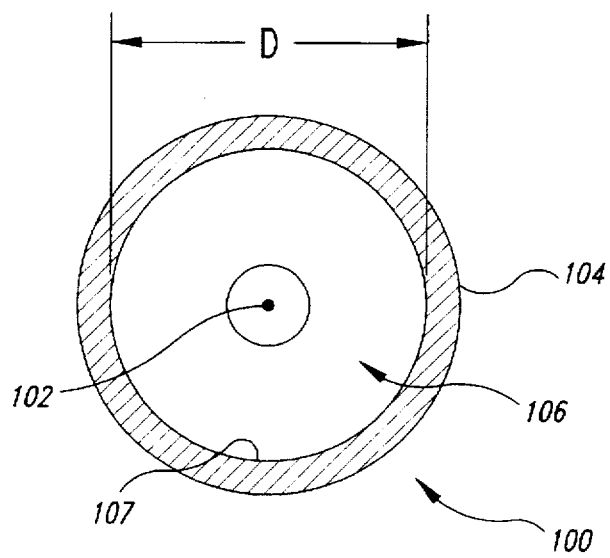
FIG. 2 is a cross-sectional view of the stylus sheath taken substantially through line A—A in FIG. 1.

FIG. 2 illustrates a cross-sectional view of the sheath 100 with a transverse dimension or diameter D. When a cylindrical instrument such as the pencil 103 is inserted into the internal volume 106, sheath 100 can expand, allowing the transverse dimension D to increase and allowing the sheath 100 to exert a radially compressive force upon the pencil and hold it securely, but removably, within the sheath.

Figure 3:
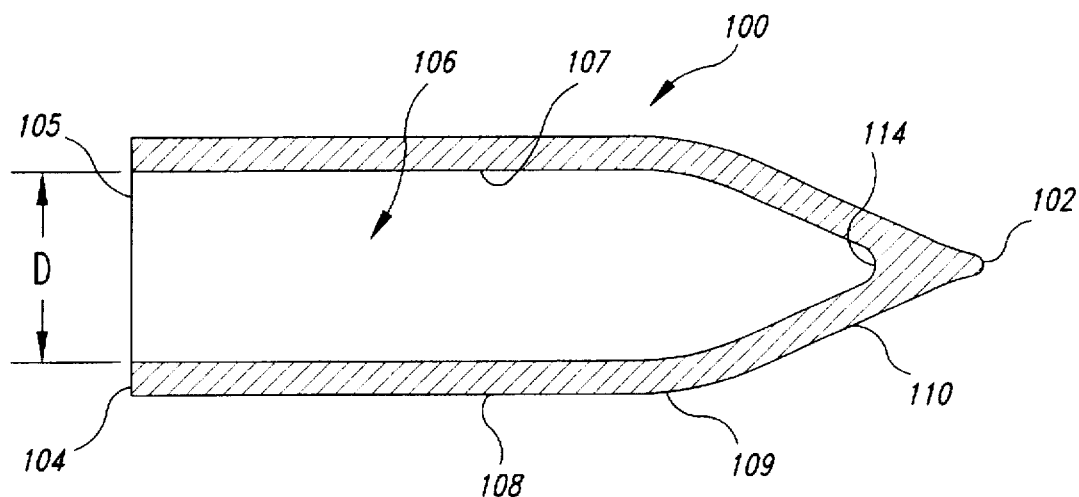
FIG. 3 is a cross-sectional view of the stylus sheath taken substantially through line B—B in FIG. 1.

Referring to FIG. 3, the proximal opening 105 leads to the interior volume 106. The internal volume 106 is bounded by the proximal opening 105 and an interior surface 107. The interior surface 107 conforms substantially to the shape of the exterior surface 109, and is in bearing contact with the pencil 103 when the pencil is inserted into sheath 100. Extra material 114 is added to increase the stiffness of the tip 102 at the distal end. The constant cross-section portion 108 and the tapering portion 110 are integrally and seamlessly connected to make the sheath 100 a single piece. As a result, the sheath is easy to manufacture using known techniques such as injection molding.

Figure 4:
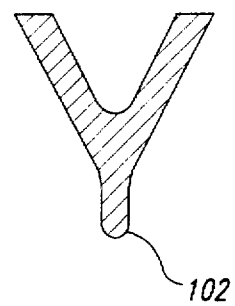
FIG. 4 is a cross-sectional view of a first alternative embodiment of the tip of the sheath, comprising a substantially hemispherical tip.

FIG. 4 shows a first alternate embodiment of the tip 102 of the sheath wherein the tip is substantially hemispherical. The first alternate embodiment is most useful when the touch-sensitive screen 112 requires a relatively sharp stylus.

Figure 5:
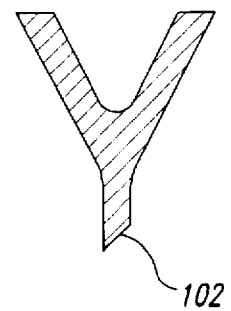
FIG. 5 is a cross-sectional view of a second alternative embodiment of the tip of the sheath, comprising a substantially chisel-shaped tip.

FIG. 5 shows a second alternate embodiment of the tip 102 wherein the tip is sharp and substantially chisel-shaped. This second alternate embodiment is most useful when broad strokes across large areas of the touch-sensitive screen 112 are required. For example, a computer application for doing calligraphy might use a chisel-shaped tip.

Figure 6:
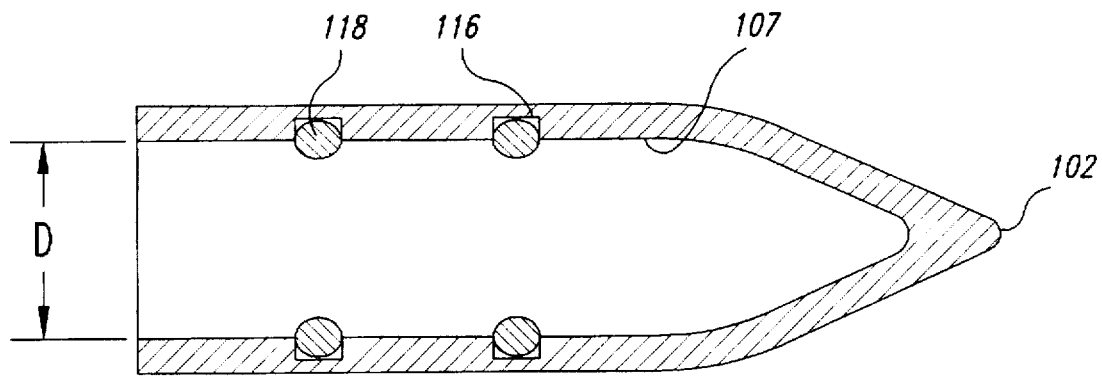
FIG. 6 is a cross-sectional view of a third alternative embodiment of the sheath, taken substantially through line B—B in FIG. 1.

FIG. 6 shows an alternative embodiment of the sheath where the sheath 100 could be made of metal that is highly polished so that it will not scratch the screen. In this case, the restraining force required to securely, but removably, hold the pencil could be supplied by O-rings 118 placed in circumferential grooves 116 cut into the inside surface 107 of the metal section.

Figure 7:
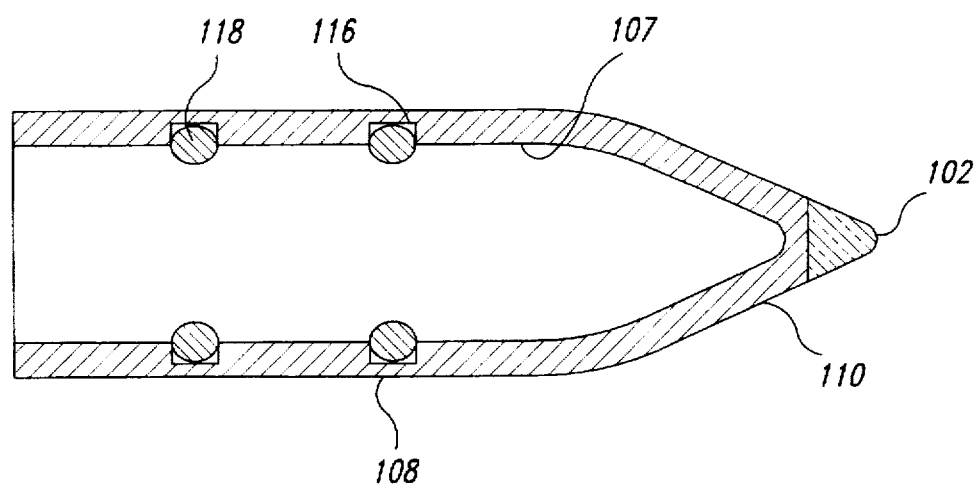
FIG. 7 is a cross-sectional view of a fourth alternative embodiment of the sheath, taken substantially through line B—B in FIG. 1.

FIG. 7 shows a second alternative embodiment of the sheath where the sheath 100 need not be a single, integrally formed piece made of a single material. The constant-dimension cross section portion 108 and fraction of the tapering portion 110 can be made of metal and then joined to a tip 102 made of an elastomeric material of appropriate hardness. The restraining force required to securely, but removably, hold the pencil 103 (FIG. 1) could again be supplied by O-rings 118 placed in circumferential grooves 116 cut into the inside surface 107 of the metal section.

Although specific embodiments of the invention have been described for purposes of illustration, various equivalent modifications may be made without departing from the spirit and scope of the invention, as is known by those skilled in the art. Accordingly, the invention is not limited by the disclosure, but instead its scope is to be determined entirely by reference to the following claims.

What is claimed is:

1. A sheath capable of being used and enclosing an end of a stylus having a first diameter and a touch-sensitive screen having a first hardness, comprising:

an elongated member extending in a longitudinal direction between a distal end and a proximal end, the member having an exterior surface generally tapering between the proximal and distal ends to reach a tip at the distal end, and having an interior volume having a second diameter and capable of securely and removably receiving the end of the stylus when inserted through a proximal opening, wherein the second diameter is less than the first diameter and wherein the proximal opening expands transversely at the proximal end of the sheath as a result of the difference between the first and second diameters, wherein the elongated member is formed at least partially of an elastomeric material having a second hardness, and wherein the second hardness is less than the first hardness.

2. The sheath of claim 1 wherein a shape of the internal volume is bounded by the proximal opening and an internal surface which substantially conforms to a shape of the exterior surface.

3. The sheath of claim 1 wherein the second diameter of the proximal opening and the interior volume are capable of securely and removably accommodating insertion of an elongated cylindrical instrument.

4. The sheath of claim 1 wherein the sheath is diametrically expandable between contracted and expanded forms, exerting a radially compressive retaining force to restrict movement of the sheath relative to the stylus.

5. The sheath of claim 1 wherein the sheath has a cylindrical portion with constant diameter between the proximal end and an intermediate position between the proximal and distal ends, and thereafter a tapering portion which tapers to a tip at the distal end, the cylindrical and tapering portions of the sheath being integrally connected and removable from the stylus as a unit.

6. The sheath of claim 1 wherein a longitudinal dimension of the sheath extends upwardly beyond an end of the stylus a sufficient distance to be gripped by the thumb and forefingers of a user's hand.

7. The sheath of claim 1 wherein the sheath consists of a material having a durometer rating of between 60 and 90.

8. The sheath of claim 1 wherein the sheath tapers to a sharply pointed and substantially chisel-shaped tip.

9. The sheath of claim 1 wherein the sheath tapers to a rounded and substantially hemispherical tip.

10. The stylus sheath of claim 1 wherein alphanumeric characters are placed on the exterior surface of the sheath.

11. A cover capable of being used and enclosing an end of an elongated cylindrical instrument and a touch-sensitive screen having a first hardness, comprising:

a cover member extending in a longitudinal direction between a distal end and a proximal end, the cover member having an exterior surface between the proximal and distal ends, and having an interior volume capable of securely and removably receiving the end of the elongated cylindrical instrument when inserted through a proximal opening of the cover member; and a tip coupled to the distal end of the cover member having a second hardness, wherein the second hardness is less than the first hardness.

12. The cover of claim 11 wherein the shape of the internal volume is bounded by the proximal opening and an internal surface which substantially conforms to the shape of the exterior surface.

13. The cover of claim 11 wherein transverse dimensions of the proximal opening and the interior volume are capable of securely and removably accommodating insertion of the elongated cylindrical instrument.

14. The cover of claim 11 wherein the cover member exerts a radial retaining force to restrict movement of the cover member relative to the elongated cylindrical instrument.

15. The cover of claim 11 wherein the cover member has a cylindrical portion with a constant transverse dimension between the proximal end and an intermediate position between the proximal and distal ends, and thereafter a tapering portion which tapers to form the tip at the distal end, the cylindrical and tapering portions of the cover member being integrally connected and removable from the elongated cylindrical instrument as a unit.

16. The cover of claim 11 wherein a longitudinal dimension of the cover member extends upwardly beyond an end of the elongated cylindrical element a sufficient distance to be gripped by the thumb and forefingers of a user's hand.

17. The cover of claim 11 wherein the cover member consists of a material having a durometer rating of between 60 and 90.

18. The cover of claim 11 wherein the tip tapers to a sharply pointed and substantially chisel-shaped tip.

19. The cover of claim 11 wherein the tip tapers to a rounded and substantially hemispherical tip.

20. The cover of claim 11 wherein alphanumeric characters are placed on the exterior surface of the cover.

21. An input system, comprising:
   a touch-sensitive electronic screen having a first hardness;
   control electronics coupled to the touch-sensitive screen;
   an elongated cylindrical instrument;
   a cover member and enclosing a distal portion of the elongated cylindrical instrument extending in a longitudinal direction between a distal end and a proximal end, the cover member having an exterior surface between the proximal and distal ends, and having an interior volume capable of securely and removably receiving an end of the elongated cylindrical instrument when inserted through a proximal opening of the cover member; and
   a tip coupled to the distal end of the cover member and having a second hardness, wherein the second hardness is less than the first hardness.

22. The input system of claim 21 wherein the shape of the internal volume is bounded by the proximal opening and an internal surface which substantially conforms to the shape of the exterior surface.

23. The input system of claim 21 wherein the proximal opening and the interior volume are capable of securely and removably accommodating insertion of the elongated cylindrical instrument.

24. The input system of claim 21 wherein the cover member exerts a radial retaining force to restrict movement of the cover member relative to the elongated cylindrical instrument.

25. The input system of claim 21 wherein the cover member has a cylindrical portion with constant transverse dimensions between the proximal end and an intermediate position between the proximal and distal ends, and thereafter a tapering portion which tapers to form the tip at the distal end, the cylindrical and tapering portions of the cover being integrally connected and removable from the elongated cylindrical instrument as a unit.

26. The input system of claim 21 wherein a longitudinal dimension of the cover member extends upwardly beyond an end of the elongated cylindrical element a sufficient distance to be gripped by the thumb and forefingers of a user's hand.

27. The input system of claim 21 wherein the cover member consists of a material having a durometer rating of between 60 and 90.

28. The input system of claim 21 wherein the tip tapers to a sharply pointed and substantially chisel-shaped tip.

29. The input system of claim 21 wherein the tip tapers to a rounded and substantially hemispherical tip.

30. The input system of claim 21 wherein alphanumeric characters are placed on the exterior surface of the cover.

* * * * *